(12) United States Patent
Welsh (10) Patent No.: US 8,042,659 B1
(45) Date of Patent: Oct. 25, 2011

(54) ACTIVE FORCE GENERATION/ISOLATION SYSTEM EMPLOYING MAGNETO RHEOLOGICAL FLUID (MRF)

(75) Inventor: William Arthur Welsh, New Haven, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1065 days.

(21) Appl. No.: 10/685,053

(22) Filed: Oct. 14, 2003

(51) Int. Cl.
*F16F 9/53* (2006.01)
(52) U.S. Cl. .................... 188/267.2; 416/80; 416/500
(58) Field of Classification Search ............ 267/140.15; 416/500, 145, 43, 80, 61; 74/573 F, 573 R; 188/267–267.2, 266.3, 268, 290, 293, 296, 188/161, 162, 164
See application file for complete search history.

(56) References Cited

U.S. PATENT DOCUMENTS

| | | | | |
|---|---|---|---|---|
| 3,219,120 A | * | 11/1965 | Hooper | 416/145 |
| 3,538,469 A | * | 11/1970 | Litte et al. | 335/219 |
| 5,497,861 A | * | 3/1996 | Brotz | 188/267.1 |
| 5,757,662 A | * | 5/1998 | Dyer et al. | 700/279 |
| 2001/0035068 A1 | * | 11/2001 | Case et al. | 74/573 R |

FOREIGN PATENT DOCUMENTS

| JP | 02150526 A | * | 6/1990 |
|---|---|---|---|
| JP | 2001099739 A | * | 4/2001 |

* cited by examiner

*Primary Examiner* — Xuan Lan Nguyen
(74) *Attorney, Agent, or Firm* — Carlson Gaskey & Olds, P.C.

(57) ABSTRACT

A system for reducing vibrations in a rotating system uses a variable viscosity medium that is redistributed in a housing connected to the rotating system. Specifically, the medium is responsive to a control signal that is generated as a function of rotational speed of the rotational system. The control signal activates a triggering device that promotes a change in viscosity of the medium such that it is distributed within the housing in a manner that reduces vibratory loads.

10 Claims, 5 Drawing Sheets

ACTIVE FORCE GENERATION/ISOLATION SYSTEM EMPLOYING MAGNETO RHEOLOGICAL FLUID (MRF)

TECHNICAL FIELD

This invention relates to vibration isolators, and more particularly, to a new and useful isolation system for minimizing in-plane vibrations produced in a rotating system, and still more particularly, to an isolation system that employs a Magneto Rheological Fluid (MRF) as the working inertial mass of the system. The MRF isolation system minimizes system weight, aerodynamic drag, and complexity while concomitantly providing active control and adjustment during operation for optimal efficacy across a wide spectrum of operating speeds.

BACKGROUND OF THE INVENTION

Vibration isolation and absorption is often desirable for nulling or canceling vibrations associated with a rotating system. Such vibrations, when left unattenuated or unabated, may lead to structural fatigue and premature failure of system components. Furthermore, inasmuch as such vibrations may be transmitted through adjacent support structure to, for example, an aircraft avionics bay or to areas occupied by passengers, other components and cabin area remote from the source of the vibration, may be subject to these same potentially damaging or disturbing vibrations (albeit perhaps lower in amplitude due to energy absorption by the interconnecting structure). Consequently, it is most desirable to isolate or absorb these vibrations at or near the source of the vibration in the rotating system.

One application which best exemplifies the need for and advantages derived from vibration isolation/absorption devices is the main torque driving hub of a helicopter rotor system. Typically, the main rotor of a helicopter, which comprises a central torque drive hub member for driving a plurality of lift producing rotor blades, is subject to a variety of aerodynamic and gyroscopic loads. For example, as each rotor blade advances or retreats relative to the freestream airflow, it experiences a sharp rise and fall of in-plane aerodynamic drag. Furthermore, as the tip of each rotor blade advances with each revolution of the rotor system, the relative velocity seen by the blade tip approaches supersonic Mach numbers. As such, large variations are caused to occur in the various coefficients which define blade performance (e.g., moment, lift and drag coefficients). Moreover, gyroscopic and Coriolis forces are generated causing the blades to "lead" or "lag" depending upon cyclic control inputs made to the rotor system. All of the above, generate substantial in-plane and out-of-plane vibrations, which, if not suppressed, isolated or otherwise abated, are transmitted to the cockpit and cabin, typically through the mounting feet of the helicopter main rotor gearbox.

Various vibration isolation systems have been devised to counteract/oppose and minimize these in-plane and out-of-plane vibrations. Mast-mounted vibration isolators suppress or isolate in-plane vibrations at a location proximal to the source of such in-plane vibrations whereas transmission, cabin or cockpit absorbers dampen or absorb out-of-plane vibrations at a location remotely disposed from the source. Inasmuch as the present invention relates to the isolation of in-plane vibrations, only devices designed to counteract/oppose such vibrations will be discussed herein.

Vincent el al. U.S. Pat. Nos. 4,145,936 and 4,225,287 disclose mast-mounted vibration isolators having a plurality of resilient arms (i.e., springs) extending in a spaced-apart spiral pattern between a hub attachment fitting and a ring-shaped inertial mass. Several pairs of spiral springs (i.e., four upper and four lower springs) are mounted to and equiangularly arranged with respect to both the hub attachment fitting and the inertial mass so as to produce substantially symmetric spring stiffness in an in-plane direction. The spring-mass system, i.e., spiral springs in combination with the ring-shaped mass, is tuned in the non-rotating system to a frequency equal to N*rotor RPM (e.g., 4P for a four-bladed rotor) at normal operating speed, so that in the rotating system it will respond to both N+1 and N−1 frequency vibrations (i.e., 3P and 5P for a four-bladed rotor). N is the number of rotor blades.

While the spiral spring arrangement of the '936 and '287 patents produces a relatively small width dimension (i.e., the spiraling of the springs increases the effective spring rate), the height dimension of each vibration isolator is increased to react out-of-plane loads via the upper and lower pairs of spiral springs. This increased profile dimension increases the profile area, and consequently the profile drag produced by the isolator. Furthermore, the spiral springs must be manufactured to precise tolerances to obtain the relatively exact spring rates necessary for efficient operation. As such, manufacturing costs are increased. Furthermore, these vibration isolators are passive devices which are tuned to a predetermined in-plane frequency. That is, the vibration isolators cannot be adjusted in-flight or during operation to isolate in-plane loads which may vary in frequency depending upon the specific operating regime.

U.S. Pat. Nos. 3,540,809, 4,057,363 & 4,083,654 issued to inventors Kenigsberg and Paul et al., disclose yet another general configuration of isolator known as a "bifilar". These mast-mounted vibration isolators comprise a hub attachment fitting connected to and driven by the helicopter rotorshaft, a plurality of radial arms projecting outwardly from the fitting and a mass coupled to the end of each arm via a rolling pin arrangement. That is, a pin rolls within a cycloidally-shaped bushing thereby permitting edgewise motion of each mass relative to its respective arm. The geometry of the pin arrangement in combination with the centrifugal forces acting on the mass (imposed by rotation of the bifilar) results in an edgewise anti-vibration force at a 4 per revolution frequency which is out-of-phase with the large 4 per revolution (or "4P" as it is commonly referred to as helicopter art) in-plane vibrations of the rotor hub for a 4 bladed helicopter. The frequency of 4P is the frequency as observed in a nonrotating reference system.

Figure 1:
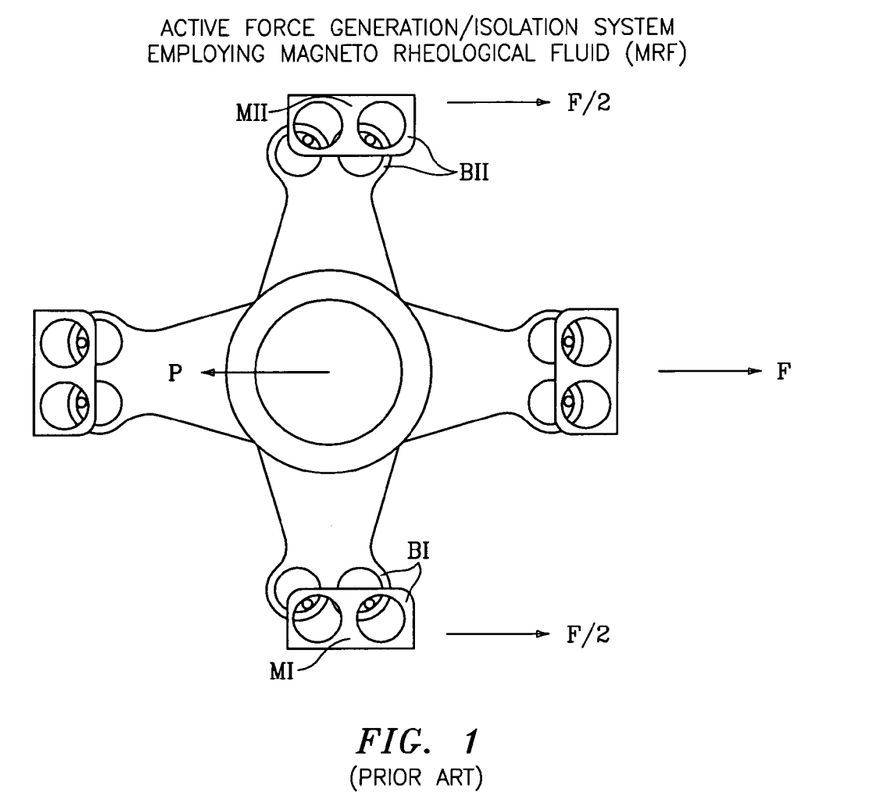
FIG. 1 is a schematic of a prior art bifilar isolation device for illustrating certain physical characteristics thereof.

More specifically, pairs of opposed masses act in unison to produce forces which counteract forces active on the rotor hub. In FIG. 1, a schematic of a pair of bifilar masses are depicted to illustrate the physics of the device at an instant of time. Therein, the masses MI, MII are disposed at their extreme edgewise position within each of the respective cycloidal bushings BI, BII. The masses MI, MII produce maximum force vectors F/2, which produce a resultant vector F at the center, and coincident with the rotational axis, of the rotating system. Furthermore, the combined or resultant force vector F is equal and opposite to the maximum vibratory load vector P active on the rotor. It will also be appreciated that for the masses to produce the necessary shear forces to react the in-plane vibratory loads of the rotor system, counteracting bending moments are also produced. These force couples impose large edgewise bending loads in the radial arms, and consequently, the geometry thereof must produce the necessary stiffness (EI) at the root end of the arms. As such, these increased stiffness requirements effect larger, heavier bifilar arms.

While the bifilar system has proven effective and reliable, the weight of the system, nearly 210 lbs, is detrimental to the overall lifting capacity of the helicopter. For example, the weight of the bifilar system displaces a passenger and/or increases fuel consumption. To appreciate the significance of the increased weight, it has been estimated that for each pound of additional weight, direct operating cost of the helicopter increases by approximately $10,000. Furthermore, the pin mount for coupling each mass to its respective radial arm routinely and regularly wear, thus requiring frequent removal and replacement of the cyclical bushings. This increases the Direct Maintenance Costs (DMC) for operating the helicopter, which contributes, to the fiscal burdens of the bifilar system and the helicopter.

Therefore, a need exists for an isolation system to reduce vibrations in a rotating system that isolates a wide spectrum of vibratory loads; especially large amplitude loads, minimizes system weight, reduces aerodynamic drag, and reduces DMC.

DISCLOSURE OF THE INVENTION

It is the object of the present invention to provide a Magneto Rheological Fluid (MRF) vibration isolation system that is controllable for varying the range of isolation frequencies.

It is another object of the present invention to provide such an MRF vibration isolation system that absorbs large amplitude vibrations while minimizing system weight.

It is still a further object of the invention to provide such an MRF isolation system that minimizes aerodynamic drag.

It is still another object of the present invention to provide such an MRF vibration isolation system that employs reliable, long-life components/elements for reducing DMC.

BRIEF DESCRIPTION OF THE DRAWINGS

A more complete understanding of the present invention may be had by reference to the following detailed description when considered in conjunction with the accompanying drawings wherein.

BEST MODES FOR CARRYING OUT THE INVENTION

The vibration isolation system 10 of the present invention is described in the context of a helicopter rotor system, such as that employed in an Army BLACK HAWK helicopter produced by Sikorsky Aircraft Corporation. One skilled in the art, however, will appreciate that the present invention has utility in any rotating system that produces vibratory loads. The invention is especially useful in rotating systems that produce large vibratory loads that vary depending upon different operating regimes or variable operating speeds.

Figure 2:
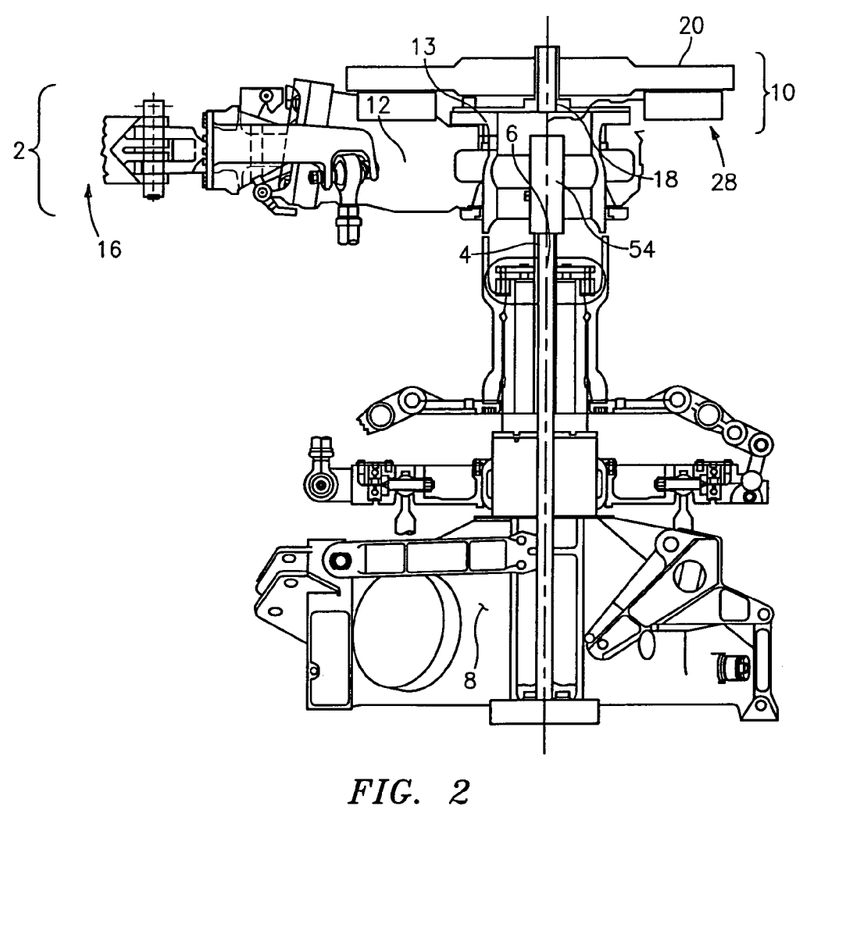
FIG. 2 is a side sectional view of a helicopter main rotor, including a main rotor shaft having an MRF isolation system according to the present invention mounted to the upper mast or shaft extension member of the rotor.
Figure 4:
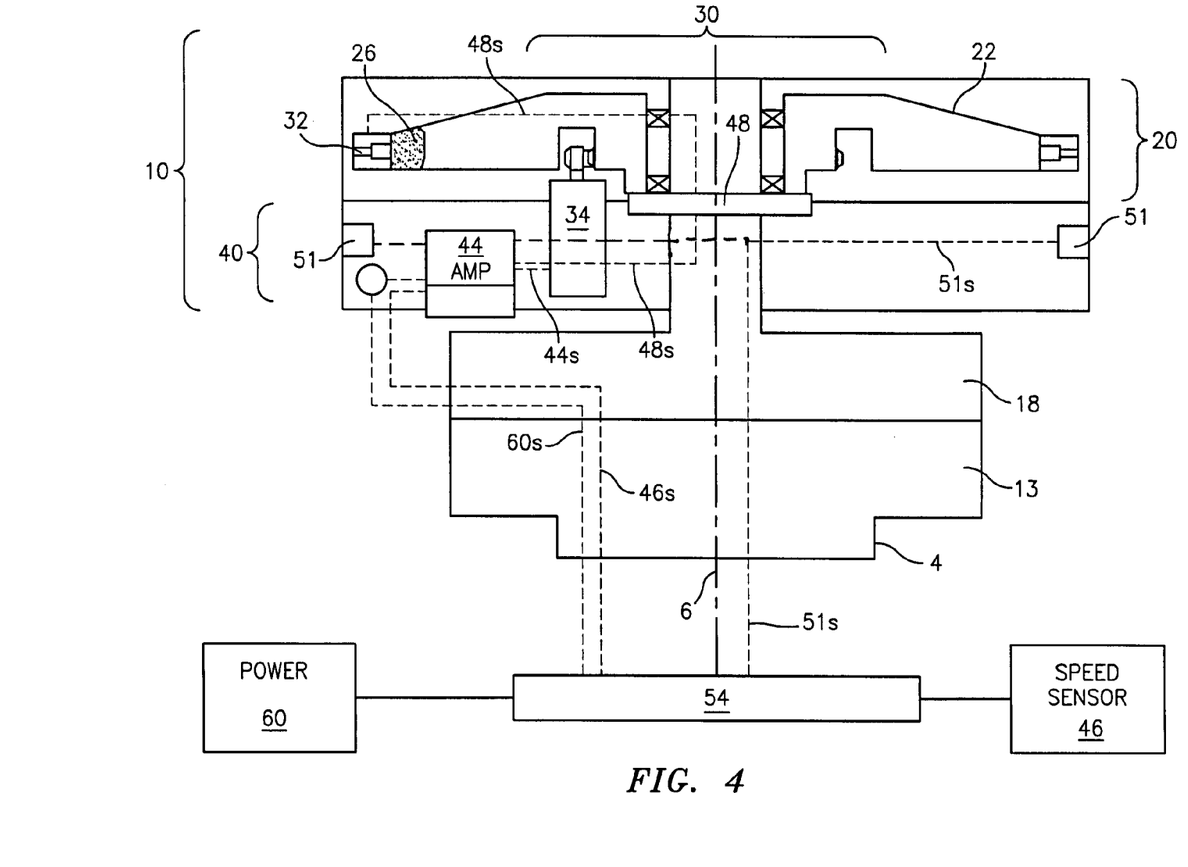
FIG. 4 is a side sectional view of a vibration absorber.

Referring to FIG. 2 and FIG. 4, the MRF vibration isolation system 10 according to the present invention is disposed in combination with a helicopter main rotor system 2 including a main rotor shaft 4 which is driven about a rotational axis 6 by a torque driving transmission 8. In the described embodiment, the main rotor system 2 includes a rotor hub 12 having four radial arms, which mount to and drive each rotor blade 16. The vibration isolation system 10 is mounted to a flanged segment 13 of the main rotor shaft 4 through a hub attachment fitting 18. Vibratory forces active on the main rotor system 2 are generated by a variety of factors, although the dominant vibrations originate from aerodynamic and/or gyroscopic forces generated by each rotor blade 16. A four bladed rotor system produces 4P vibratory loads. In a single revolution, the magnitude of the load vector varies from a minimum to a maximum value four times. While a variety of factors influence the vibratory spectrum of a rotor system, such 4P vibrations are generally a result of each rotor blade experiencing maximum lift when advancing and minimum lift when retreating. This vibration frequency can be more generally depicted by the term NP where N is the number of blades and P is the rotational speed of the rotor hub 12 of the helicopter main rotor system 2.

Referring to FIGS. 2 through 5 the vibration isolation system 10 includes a housing 20 containing a MRF 26, field generation system 28 for controlling the distribution of the MRF 26 within the housing 20, a drive system 30 for driving an enclosed chamber 22 about the rotational axis of the rotor shaft 4, and a power generator power system 60 for powering the field generation system 28 and drive system 30. More specifically, the housing 20 defines the enclosed chamber 22 for containing the MRF 26, which partially fills the chamber 22. The drive system 30 for distributing the MRF 26 within the chamber 22 includes: a field generation system 28 capable of producing an electromagnetic field within the chamber 22, a electric motor 34 for displacing the MRF 26 within chamber, and a control system 40. In the preferred embodiment, the field generation system 28 includes a multiple of electromagnets 32 disposed about the periphery of the chamber 22 including at least one electromagnet 32 disposed externally of the chamber 22 for effecting MRF flow in a direction opposing the rotational direction of the housing 20. The field generation system 28 and the drive system 30 provides a selective build-up or collection of MRF 26 in a desired location within the chamber 22 (FIGS. 3A-3C). The control system 40 selectively varies the flux of the electromagnetic field generated by the multiple of electromagnets 32 while additionally controlling the drive system 30. More specifically, the multiple electromagnets 32 produce the magnetic field within or about the chamber 22 in response to flux field signals 48s issued by the control system 40. The flux field signals 48s are indicative of strength and phase of the electromagnetic flux field, which may be varied to establish and/or alter the azimuthally varying viscosity of the MRF 26. Further, drive control signals 44s are issued to the drive system 30 for varying the speed and phase of the chamber 22 within the housing 20.

Before addressing the operation of the isolation system in yet greater detail, it is useful to describe the properties and characteristics of a magneto-rheological fluid. Magneto-Rheological Fluid (MRF) is a composition that changes state, i.e., from fluid to solid or solid to fluid, depending upon the magnitude of an electrical field, i.e., when the MRF is exposed an electromagnetic field. While the physical change is, in the most precise scientific terms, a change in viscosity of the MRF, the change may, more practically and descriptively, be viewed as a change in state i.e., from fluid to solid and visa versa. At the molecular level, upon exposure to an electric field, the molecules align in columns so as to develop compressive and bending strength/stiffness. When exposed to a high flux field, the MRF is highly viscous, develops high stiffness in compression and bending, and, consequently, cannot be readily deformed. As the flux field decreases in strength, the MRF becomes less viscous, may flow and, therefore exhibits fluidic properties.

Returning to our discussion of the vibration isolation system 10, the field generation system 28, drive system 30 and control system 40 enable the MRF 26 to change its state, shape, orientation or position within the chamber 22 through selectively energizing/de-energizing certain of the multiple of electromagnets 32 and physically distributing the MRF 26 therein. That is, by selectively changing the electromagnetic flux field and assisting/effecting the collection of MRF 26 in a particular location, the MRF 26 flow may be caused to move to desired positions within the chamber 22. The field generation system 28 is responsive to the control system 40 to selectively power one or more of the multiple of electromagnets 32 to the desired strength.

Figure 3A:
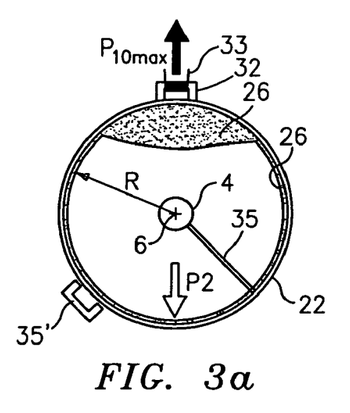
FIGS. 3a-3c depict schematic views of various operating conditions of the inventive isolation system.
Figure 3B:
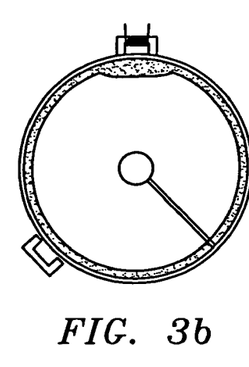
Figure 3C:
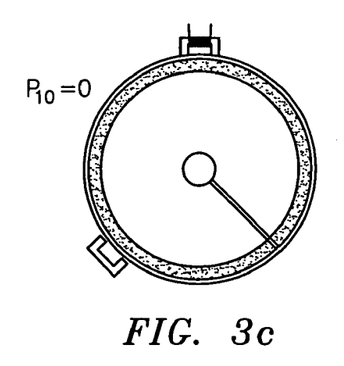

FIGS. 3A-3C and 4 show that a large flux field signal 48s to the field generation system 28 will result in a significant accumulation of MRF 26 and thus a larger eccentric mass (FIG. 3A). A zero signal will result in no accumulation thus the centrifugal forces will cause the MRF 26 to distribute uniformly on the chamber inner periphery producing zero vibratory force (FIG. 3C). The field generation system 28 is selectively controlled by signals from the control system 40. These flux field signals 48s pass through a slipring 54 to the multiple of electromagnets 32. To facilitate the desired movement of the MRF 26 within the chamber 22, the chamber 22 may have a variety of internal shapes including toroidal, annular or cylindrical. Further, the chamber 22 may be internally segmented or segregated to define a multiple of chambers capable of shuttling fluid to the appropriate position or minimizing the size of the electromagnets 32. A physical agitation system 35 may be provided to speed the movement of the MRF 26 to allow swift transitions from one force output magnitude to another. Alternatively, a stationary magnet 35' may provide agitation. Stationary magnet 35' is non-rotating. Being non-rotating but proximate to chamber 22 that encloses the MRF 26, stationary magnet 35' tends to mix the MRF 26 as the housing 22 rotates relative thereto.

The electric motor 34 independently drives the chamber 22 and MRF 26 about the axis of rotation 6 of the main rotor shaft 4. In the preferred embodiment, the drive system 30 includes an electric motor 34 for driving the chamber 22. The drive system 30 is responsive to control signals issued by the control system 40. More specifically, the control system 40 includes: a speed sensor 46 for obtaining input speed signals 46s indicative of the rotational speed 1P of the main rotor shaft 4, and a signal amplifier 44, responsive to the input speed signals 46s, for issuing control signals 44s to the drive system 30. The input speed signal 46s and the electrical power signals 60s are transmitted from a stationary system such as a fuselage to the rotating counterparts by a slip ring 54.

In operation, and referring to FIGS. 3a-3c, the MRF 26 is solidified or frozen in a particular position and, as such, functions as the working or inertial mass of the system 10. More specifically, the MRF 26 is (i) disposed at a predetermined distance R from the main rotor shaft axis of rotation 6, (ii) driven in the same or opposing rotational direction as the main rotor shaft axis of rotation 6 and (iii) driven at a rotational speed greater than the rotational speed 1P of the main rotor shaft. While the speed sensor 46 may be a dedicated unit for sensing rotor speed, the same information may be obtained from a transmission driven alternator or generator 60 (FIG. 4), which turns at a predefined speed relative to the rotor speed. The power source 60 is preferably a 15 kVa generator which provides a 115 volt, 400 Hz 3 phase potential drives the electric motor 34 and simultaneously provides the reference signal. The generator is mechanically driven by torque driving transmission 8. As a result, the rotational speed of the generator is a fixed multiple of the speed of the driving gear in the gearbox and of the main rotor Np frequency. The electrical phase of the generator voltage is a fixed multiple of the generator rotational speed. Thus, the electrical voltage phase signal is a reflection of the Np frequency. As the rotor speed and Np frequency vary while in flight, the electrical voltage phase signal also varies and is perfectly slaved to i.e. a fixed multiple of the rotor speed. This fact makes the voltage signal a good reference signal that will exactly track rotor speed. Hence, the control system 40 may use phase information from such devices to issue the appropriate control signals to the drive system 30 and to the field generation system 28.

While the vibration isolation system 10 may employ a control system 40 having a predefined schedule or model of the vibrations, e.g., at prescribed rotor speeds, the preferred embodiment also employs a vibration sensing device or system. As such, the control system 40 includes one or more vibration feedback sensors 51 for issuing vibration signals 51s indicative of the vibrations (e.g., amplitude, frequency and phase) in the helicopter, e.g., fuselage, cabin or cockpit. The control system 40, therefore, samples vibration levels at predefined intervals or rates to identify a trend—positive (lower vibration levels) or negative (larger vibration levels). Accordingly, as vibration levels change, the control system 40 issues modified control signals 44s and 48s to the drive system 30 and the field generation system 28 until a combination of rotational speed and angular position of the MRF 26 center of gravity are achieved to minimize vibratory loads in the main rotor system 2.

The vibration isolation system 10 may be powered by any of a variety of known methods, especially methods which may require transmission from a stationary to a rotating reference system. In the described embodiment, the power source 60 for the drive system 30, the control system 40, and the field generation system 28 is the 15 kVa generator which provides a 115 volt, 400 Hz 3 phase potential. Power is transferred from the stationary system to the rotating system via the slip ring 54. Negligible additional weight is required inasmuch as the slip ring 54 is pre-existing for other systems e.g., rotor blade de-ice system. Alternatively this slip ring 54 may also be used to communicate the control signals 44s, 48s, 51s to the drive system 30 and the field generation system 28 if the control system 40 is positioned in the non-rotating system.

In operation, the MRF 26 is driven at a rotational speed greater than the rotational speed of the main rotor system 2 and appropriately positioned to yield a load vector $P_{10}$ (FIG. 3A) which is equal and opposite to the vibration load vector P2 produced by the main rotor system 2. This counteracting load vector $P_{10}$ can be viewed as a vector which attempts to cancel or null the displacement of the rotor shaft 4. Inasmuch as the drive system 30 is mounted directly to the rotating shaft 4 of the main rotor system 2, the drive system 30 need only drive the chamber 22 at three additional revolutions per cycle (for each revolution of the rotor system) in the direction of rotation of the main rotor system 2 to achieve the desired 4P operating frequency for a 4 bladed rotor. That is, since the MRF 26 is, in the rotating reference system, driven at one revolution per cycle by the main rotor system 2 itself, the drive system 30 need only augment the rotational speed 1P of the main rotor system 2 by 3P, provided that the augmentation is in the same rotational direction, to achieve the necessary 4P (computed by 1P+3P=4P) frequency relative to the stationary reference system. Alternatively, the augmented rotation can be opposite to the rotor speed 1P. For example the drive system 30 can augment the rotational speed 1P by rotating the chamber 22 at 5P in the opposite direction to achieve the necessary 4P (computed by 1P−5P=−4P) frequency in the stationary reference system. For any number of rotor blades, the absolute frequency to suppress is NP where N is the number of rotor blades. The augmentation speed of the chamber 22 produced by the drive system 30 is then (N−1)P in the direction of the rotor speed or (N+1)P in the opposite direction.

Figure 5:
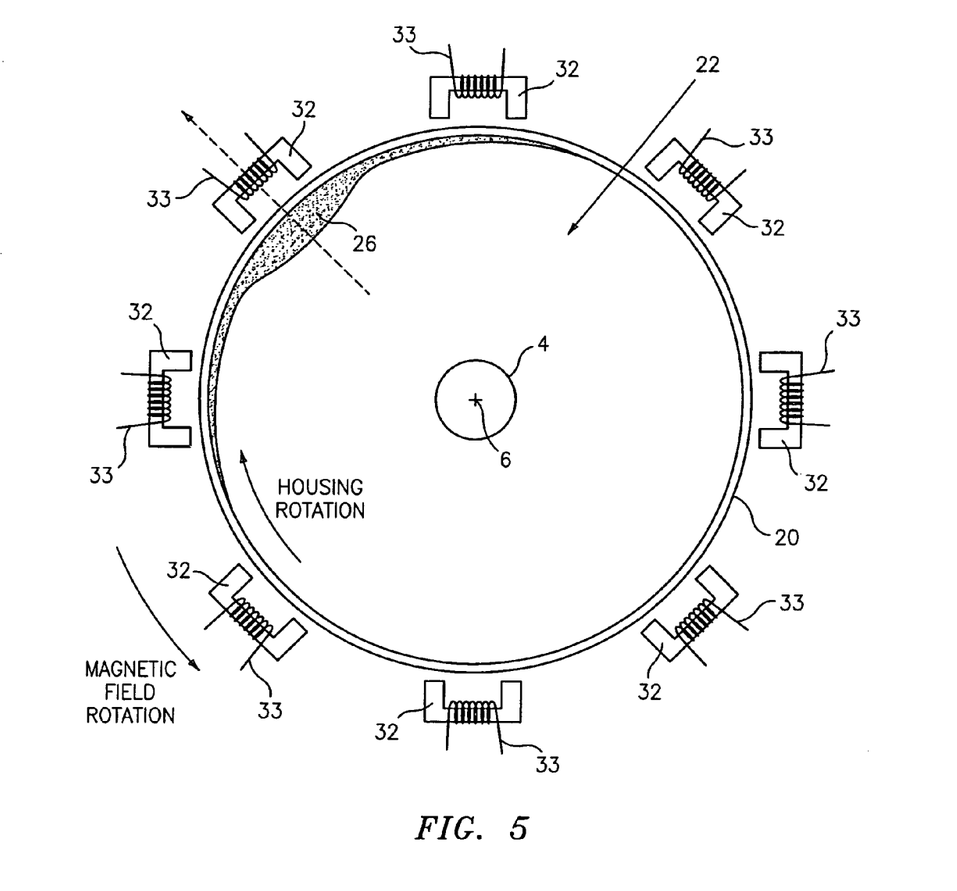
FIG. 5 is a schematic view of an alternative isolation system with stationary electromagnets.

The embodiment of FIG. 5 has the advantage of not requiring an electrical slip ring 54 to position the eccentric mass that provides the anti-vibration force. In this embodiment, the electro-magnets 32 do not rotate with the chamber 22 (FIG. 4), but are stationary. The electric power coils 33 are also stationary. The housing 20 forms an enclosed chamber 22. The MRF 26, in this example, rotates about the axis of rotation 6 of the shaft 4. In this case the shaft 4 and the housing 20 rotate together and in the counterclockwise direction at a frequency of 3P, for a 4 bladed rotor, relative to the main rotor system 2. The rotation of the shaft 4 about the axis of rotation 6 at a frequency of 3P is achieved with an electric motor or other means. The electric power to the power coils 33 is switched to the successive electromagnets 32 in the counterclockwise direction such that the magnet field rotates at the same rotational speed as the shaft 4 and chamber 22. As a result, the maximum magnetic field rotates at the same rotational speed as the chamber 22 and is thus stationary relative to the housing 20. As a consequence, the MRF 26 accumulates in the housing 20 at a point of the maximum magnet field. In this manner, the bulk of the MRF 26 forms an eccentric mass according to the commanded phase of the magnetic field position. The resulting eccentric mass causes an eccentric centrifugal force that can be adjusted to suppress the unwanted ambient force.

Lessening or increasing the amount electrical current applied to the power coils 33 varies the amount of MRF 26 that accumulates at a chosen angular location in the housing 22. In an extreme case, the current can be zero or very low. This condition will cause the MRF 26 to be distributed uniformly around the periphery of the chamber 22 (FIG. 3C). As the amount of current sequentially applied to the power coils 33 of the electromagnets 32 is increased, the amount of MRF 26 that accumulates at the chosen azimuth phase in the housing 22 will increase, thus causing a correspondingly large eccentric force to suppress an unwanted ambient force.

A stationary permanent magnet 35' can be placed near the housing 20 for a beneficial effect of causing the MRF 26 in the chamber 22 to mix more readily. This will have the effect of speeding the change in position of MRF 26 to a desirable location when the location desired is changed to reduce a changing magnitude or phase of unwanted ambient force.

Independently varying the location and magnitude of the MRF 26 within the housing 20 is especially valuable in applications wherein the magnitude of the vibratory load active in/on the rotating system varies as a function of operating regime or operating speed. In a rotorcraft, for example, it is common to require the highest levels of vibration isolation in high speed forward flight i.e., where the rotor blades are experiencing the largest differential in aerodynamic loading from advancing to retreating sides of the rotor system. Consequently, it may be expected that the vibration isolation system 10 produce a maximum load vector $P_{10max}$ (FIG. 3a): In another example, it is anticipated that the lowest levels of vibration isolation would be experienced in a loiter or hovering operating mode, where the rotor blades are exposed to the same aerodynamic and gyroscopic affects. Consequently, it may be expected that the vibration isolation system 10 produce no or a minimum load vector, $P10_{min}$ (FIG. 3c).

In summary, the vibration isolation system 10 is capable of nulling or canceling vibrations across a wide frequency spectrum. That is, the vibration isolation system 10 is capable of varying its operating frequency irrespective of changes in operating regime or operating speed. Furthermore, the vibration isolation system 10 employs few moving parts, thus increasing reliability while reducing Direct Maintenance Costs. While the prior art bifilar requires frequent repair or replacement of the cycloidal bushings, the MRF 26 does not induce wear. Moreover, the vibration isolation system 10 employs fixed components such as electromagnets which are highly reliable and require negligible if any maintenance. Finally, the vibration isolation system employs a low profile circular housing 20. As such, the vibration isolation system 10 of the present invention reduces aerodynamic drag when compared to prior art spiral spring isolators (discussed in the background of the invention).

Although the invention has been shown and described herein with respect to a certain detailed embodiment of a mast-mounted helicopter isolator, it will be understood by those skilled in the art that a variety of modifications and variations are possible in light of the above teachings. It is therefore to be understood that, within the scope of the appended claims, the present invention may be practiced otherwise than as specifically described hereinabove.

What is claimed is:

1. A vibration isolation system for reducing vibrations in a rotating system which rotates about an axis of rotation, comprising:
    an enclosed chamber mounted to the rotating system for rotation about said axis of rotation independent of the rotating system;
    a Magneto Rheological Fluid (MRF) at least partially filling said enclosed chamber;
    an electromagnetic field generation system mounted adjacent said enclosed chamber to azimuthally vary a viscosity of said MRF and distribute said MRF within said enclosed chamber to reduce a vibratory load in said rotating system;
    a drive system which includes an electric motor to drive said enclosed chamber about said axis of rotation at a rotational speed greater than the rotating system; and
    a generator which drives said electric motor, a phase of the voltage from said generator providing a phase reference to said control system indicative of a rotational speed of the rotating system.

2. A helicopter rotor system which rotates about an axis of rotation, comprising:
    a main rotor system having an N number of blades which rotates about an axis of rotation at a rotational speed of 1P, such that said main rotor system produces NP vibrations;
    an enclosed chamber mounted to said main rotor system for rotation about said axis of rotation independent of said main rotor system;
    a Magneto Rheological Fluid (MRF) at least partially filling said enclosed chamber;
    a sensor system which senses the NP vibrations;
    a control system in communication with said sensor system, said control system operable to identify variations of the NP vibrations;

an electromagnetic field generation system mounted adjacent said enclosed chamber to azimuthally vary a viscosity of said MRF and distribute said MRF within said enclosed chamber to form an eccentric mass in response to said control system to reduce said NP vibrations; and a drive system which includes an electric motor to drive said enclosed chamber about said axis of rotation at an absolute rotational speed of NP in the direction of the main rotor assembly.

3. A helicopter rotor system which rotates about an axis of rotation, comprising:

a main rotor system having an N number of blades which rotates about an axis of rotation at a rotational speed of 1P, such that said main rotor system produces NP vibrations;

an enclosed chamber mounted to said main rotor system for rotation about said axis of rotation independent of said main rotor system;

a Magneto Rheological Fluid (MRF) at least partially filling said enclosed chamber;

a sensor system which senses the NP vibrations;

a control system in communication with said sensor system, said control system operable to identify variations of the NP vibrations;

an electromagnetic field generation system mounted adjacent said enclosed chamber to azimuthally vary a viscosity of said MRF and distribute said MRF within said enclosed chamber to form an eccentric mass in response to said control system to reduce said NP vibrations; and a drive system which includes an electric motor to drive said enclosed chamber about said axis of rotation at an absolute rotational speed of (N+1)P in a direction opposite of the main rotor assembly.

4. A helicopter rotor system which rotates about an axis of rotation, comprising:

a main rotor system having an N number of blades which rotates about an axis of rotation at a rotational speed of 1P, such that said main rotor system produces NP vibrations;

a housing mounted to said main rotor assembly;

an enclosed chamber mounted within said housing for rotation about said axis of rotation independent of said main rotor assembly;

an electric motor located within said housing to drive said enclosed chamber about said axis of rotation independent of said main rotor assembly;

a Magneto Rheological Fluid (MRF) at least partially filling said enclosed chamber;

a sensor system which senses the NP vibrations;

an electromagnetic field generation system mounted adjacent said enclosed chamber to azimuthally vary a viscosity of said MRF and distribute said MRF within said enclosed chamber to form an eccentric mass; and a control system in communication with said sensor system, said electric motor, and said electromagnetic field generation system, said control system operable to identify variations of the NP vibrations to control a rotational speed of said enclosed chamber and said electromagnetic field generation system to control distribution of said MRF within said enclosed chamber to reduce the NP vibrations.

5. The system as recited in claim 4, further comprising a generator driven by said main rotor system which powers said electric motor, a phase of the voltage from said generator providing a phase reference to said control system indicative of a rotational speed of the said main rotor system.

6. A method of reducing vibrations in a helicopter rotor system which rotates about an axis of rotation comprising the steps of:

(1) rotating an enclosed chamber mounted to a main rotor system about the axis of rotation independent of the main rotor system, the enclosed chamber at least partially filled with a Magneto Rheological Fluid (MRF);

(2) sensing a vibration generated by the main rotor system;

(3) varying an electromagnetic field about the enclosed chamber to azimuthally vary a viscosity of said MRF and distribute said MRF within said enclosed chamber to form an eccentric mass in response to said step (2) to reduce the vibration; and (4) varying an electric motor speed that rotates the enclosed chamber to match an optimal phase relative the vibration in response to controller commands.

7. A method as recited in claim 6, wherein said step (3) further comprises:

varying the electromagnetic field in response to a predefined schedule.

8. A method as recited in claim 6, wherein said step (3) further comprises:

(a) sensing a trend in a variation of the vibrations generated by the main rotor system; and (b) varying the electromagnetic field in response to the trend.

9. A method as recited in claim 6, wherein said step (3) further comprises:

(a) forming the eccentric mass within the enclosed chamber in an azimuthal position about the axis of rotation in response to a commanded strength of the electromagnetic field position.

10. A method as recited in claim 6, wherein said step (4) further comprises the steps of:

(a) mechanically driving a generator in response to a speed of the main rotor system, the rotational speed of the generator being a fixed multiple of the speed of the main rotor system NP frequency;

(b) driving the electric motor with the generator to rotate the enclosed chamber;

(c) determining a phase reference signal from a voltage of the generator to indicate a rotational speed of the main rotor system; and (d) determining the optimal phase of the electric motor from the phase reference signal.

* * * * *